United States Patent [19]
Cazes

[11] 4,269,276
[45] May 26, 1981

[54] PLOW ATTACHMENT ASSEMBLY FOR A CRAWLER-TYPE TRACTOR

[76] Inventor: Lyle C. Cazes, 81 Hamm Rd., R.R. 1, Abbotsford, British Columbia, Canada, V2S 1M3

[21] Appl. No.: 60,799

[22] Filed: Jul. 25, 1979

[51] Int. Cl.³ .............................................. E02F 3/76
[52] U.S. Cl. .................................... 172/832; 37/2 R
[58] Field of Search ............. 172/276, 272, 801, 802, 172/199, 195; 37/98, 2 R, 2 P

[56] References Cited

U.S. PATENT DOCUMENTS

| | | | |
|---|---|---|---|
| 2,173,406 | 9/1939 | Wilkinson | 172/199 X |
| 2,364,657 | 12/1944 | Proctor | 37/98 |
| 2,508,284 | 5/1950 | Oliver | 37/2 R |
| 2,832,382 | 4/1958 | Lahar | 37/2 R |
| 2,911,735 | 11/1959 | Sanner | 37/98 |
| 2,990,632 | 7/1961 | Noblin | 172/277 |
| 3,442,035 | 5/1969 | Hymel | 172/776 X |

*Primary Examiner*—Richard J. Johnson
*Attorney, Agent, or Firm*—Carver & Co.

[57] ABSTRACT

A plow attachment assembly for a crawler-type tractor having an elevatable "C" frame which includes a first "V" shaped plow adapted to be rigidly secured to the "C" frame, a second "V" shaped plow which is roller supported for movement over the ground disposed ahead of the first plow and connected to the latter by a strut, the forward end of which is rigidly secured to the second plow and hingedly secured to the first plow for vertical swinging movement and a pair of telescopic spreader arms extending rearwardly from the second plow and having a hinged connection to the "C" frame for moving debris spread by the first plow laterally on opposite sides of the tractor and for levelling top soil plowed by the second plow laterally in the path of the tracks of the tractor.

4 Claims, 6 Drawing Figures

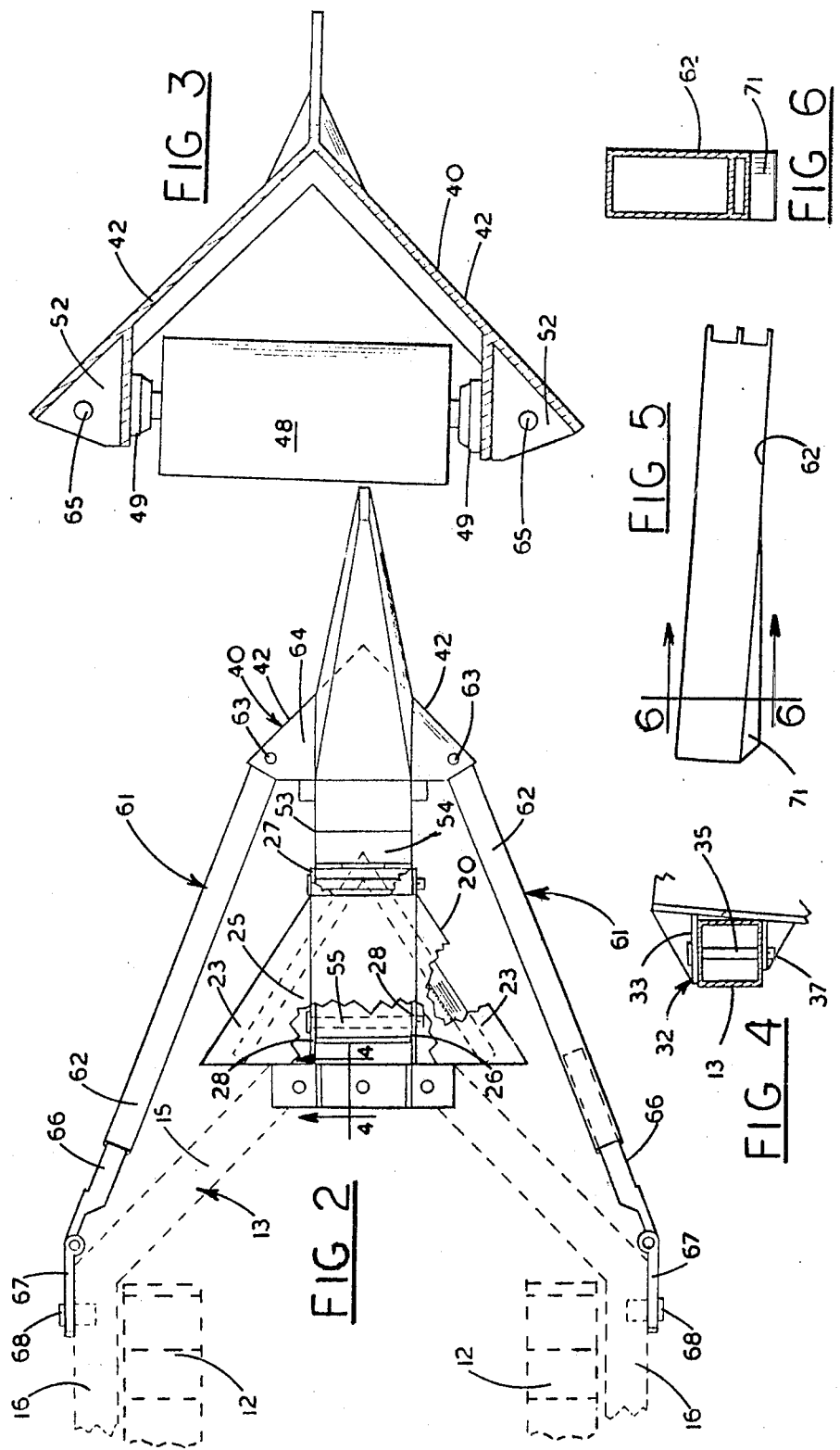

PLOW ATTACHMENT ASSEMBLY FOR A CRAWLER-TYPE TRACTOR

BACKGROUND OF THE INVENTION

1. Field of the Invention

This invention relates to plow attachments for crawler-type tractors and in particular for plow attachments for preparing a logged area for reseeding.

2. Prior Art

The preservation and perpetuation of timber resources has required, for some years, reseeding of logged areas, the reseeding usually being done by hand. However, in areas where terrain is suitable, equipment has heretofore been devised to provide for mechanized reseeding. In order to prepare a logged area for such seeding, it has been the standard practice to simply windrow the debris in a logged area to provide for passage of seeding equipment. To this end, windrowing equipment has simply constituted a blade assembly which is mounted at the front end of a crawler-type tractor which is moved through the logged area and simply shoves the debris to either side of the tractor. It has been found that the cleared area between windrows is quite often not suitable for the passage of rubber-tired equipment which may be used for reseeding or for subsequent fertilizing of the growing seedlings.

Furthermore, such prior art plow equipment does nothing to enhance or improve growth characteristics of an area where the natural humus layer is very thin.

SUMMARY OF THE INVENTION

The present invention provides a plow assembly for reforestation of logged areas which, like prior art plow assemblies, can be operated to windrow the debris in a logged area, but also prepares a substantially smooth roadway between windrows to facilitate passage of seeding, maintenance and fertilizing equipment and, furthermore, increases depth of the humus layer on either side of the roadway in which the seedlings can be planted.

The plow assembly of the present invention, which is adapted to be mounted on an elevated "C" frame of a crawler-type tractor, comprises a first "V" shaped plow adapted to be secured rigidly to the "C" frame, a fore and aft extending strut hingedly mounted at its aft end on the first plow for vertical swinging movement, a second "V" shaped plow rigidly secured at the forward end of the strut, said second plow having a ground-engaging roller mounted thereon for providing rolling support of the second plow on the ground surface, and a pair of telescopically extensible and retractable spreading arms disposed on opposite sides of the first plow, being hingedly secured at their forward ends to the second plow and hingedly secured at their aft ends to the "C"frame.

A detailed description following, related to the drawings, gives exemplification of apparatus and method according to the invention which, however, is capable of expression in method and means other than those particularly described and illustrated.

DESCRIPTION OF THE DRAWINGS

FIG. 2 is a plan view of the plow apparatus with portions thereof broken away, FIG. 3 is a section taken on Line 3—3 of FIG. 1, FIG. 4 is a section taken on Line 4—4 of FIG. 2, FIG. 5 is an elevation view of a spreader arm, FIG. 6 is a section taken on Line 6—6 of FIG. 5.

DETAILED DESCRIPTION

Figure 1:
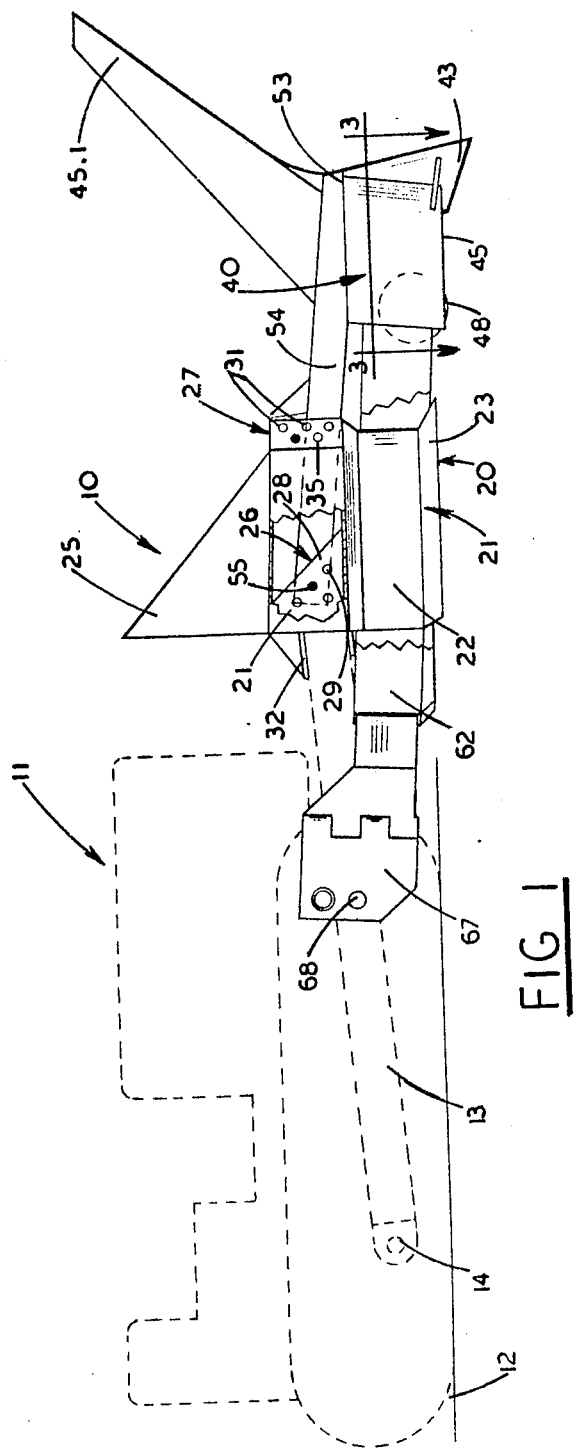
FIG. 1 is a side elevation of apparatus in accordance with the invention, attached to a crawler-type vehicle (shown in broken outline) with portions thereof broken away.

Referring to the drawings, and in particular to FIGS. 1 and 2, a plow apparatus 10, in accordance with the invention, is shown mounted on a conventional crawler-type tractor 11 (shown in broken outline). The tractor, conventionally, has tracks 12 and, conventionally, has a "C" frame 13 pivotally mounted on the tractor for vertical movement on pins 14. As is conventional, the "C" frame is elevatable by hydraulic, or cable, means (not shown) and is operable by conventional means by the tractor operator. The "C"frame is normally of a box construction and is usually provided with openings selectively disposed to facilitate the attachment thereto of equipment such as dozer blades and the like. Furthermore, the tractor, where it is to be worked in areas, such as logged areas, is usually provided with a protective framework (not shown) to protect the driver from falling debris, and the like. Further, the "C" frame is constructed so as to have a "U" shaped forward portion 15 and a pair of parallel side arms 16 which encompass or extend along opposite sides of the tracks of the tractor.

The plow apparatus 10 has a first "V" shaped plow 20 having a lower portion 21 having vertical side walls 22. Downwardly inclined plow share portions 23 project outwardly along lower edges of each of the vertical walls 22. The width of the lower portion between aft ends of the vertical walls is substantially the same as the distance between the inner sides of the tracks as may be appreciated from FIG. 2. The first plow also has an upper internally braced hood section 25 which is provided with a pair of fore and aft spaced-apart yokes 26 and 27. The yoke 26 is simply a pair of spaced apart parallel plates 28—28 having vertically and horizontally spaced aligned openings 29. The yoke 26 not only serves as a yoke, but as internal bracing for the hood portion 25. The yoke 27 is similarly constructed and has vertically and horizontally spaced apart openings 31.

Projecting rearwardly from the aft end of the hood is a bracket 32 (see FIG. 4) formed of a pair of spaced apart braced plates 33—33 between which the "U" shaped forward portion 15 of the "C" frame has a sliding fit.

Pins 35 extend through suitable holes in the braced plates and through suitable holes in the frame to provide a rigid cantilevered connection of the first plow and the "C" frame so that the elevation of the first plow relative to the ground level can be adjusted by suitable vertical adjustment of the "C" frame.

The plow assembly also has a second, or lead, plow 40. The lead plow is also "V" shaped, having vertical side walls 42—42 which extend rearwardly from a ripping or scarifying blade 43 which depends below the lower edges 45 of the side walls 42 and has an upwardly projecting guard 45.1. The lead plow 40 also has a roller 48, in the form of a cylindrical drum, which is disposed between the side walls 42 and near the aft end of the latter in bearings 49 mounted on stiffened plates 52—52. The roller provides a depth-regulating means for limiting the depth of penetration of the lead plow beneath the ground surface. The lead plow is rigidly secured at the forward end 53 of a strut, or beam, 54 which is box-sectioned and which extends rearwardly between the yokes 26 and 27 of the first plow. This strut is hingedly mounted at its aft end on a pin 55 which can be extended through any of a pair of aligned openings 29 in the yoke 26. This hinged connection provides for free vertical swinging movement of the strut and thus the lead plow, however, the yoke 27 constrains relative lateral movement of the two plows. Furthermore, both plows can be secured together for mutual vertical swinging movement by inserting a pin through a suitable pair of aligned openings 35 in the yoke 27 beneath the strut.

The plow assembly also includes a pair of telescopically extensible and retractable spreader arms 61—61. Each arm has a forward section 62 (see FIG. 2) which is hingedly mounted on a hinge pin 63 which extends vertically through an opening in a top plate 64 of the lead plow and through openings 65 in the brace plates 52—52 (see FIG. 3). The forward section 62 of each arm is telescopically united with an aft portion 66 which itself is hingedly connected at its aft end to an attachment plate 67 which is pivotally secured to one of the side arms 16 of the "C" frame, laterally outside the tracks 12, as seen in FIG. 2 on a pin 68 which can be extended into a suitable opening in said side arms. As shown in FIG. 1, the attachment plates have a plurality of openings through which the pin 68 can be extended so as to provide for vertical adjustment of the plate relative to the "C" frame. Each spreader arm also has a forwardly tapering spreader depending section 71 adjacent its aft end.

The vertically adjustable attachment plate 67 and vertical adjustment of the hinge point of the strut enables the plow assembly to be adjusted to suit various terrain conditions and the thickness of the humus layer. In use, the plow assembly is adjusted so that both plows are at the same elevation at a specified depth beneath the ground surface, normally just at or below the humus layer. When the plow assembly is moved forwardly by the tractor, the scarifying blade 43 will penetrate the soil sufficient to cut roots and the like so that the lead plow and the spreader arms move the debris, such as logs and small trees and the like, laterally outside of the tracks of the tractor. The arms, and in particular the depending tapered portions thereof, will then spread the humus layer thus excavated into the path of the tracks of the vehicle. The first plow, the depth of which can be continually adjusted by suitable adjustment to the "C" frame, will also lift any of the humus layer missed by the lead plow and move it laterally into the tracks of the tractor so as to provide two parallel compressed humus beds separated by a relatively smooth lane suitable for providing a roadway for seeding equipment which may follow the plow assembly, the seedlings of course to be planted in the compressed humus layer of the pathway or road so as to facilitate movement of narrow width rubber-tired or tracked equipment therethrough.

As heretofore explained, the first plow and lead plow can be locked together by simply pinning the strut to the yoke 27. This is quite often necessary where soft ground conditions, deep penetration of the lead plow is to be avoided or where both plows must be lifted clear of the ground surface when moving from site to site.

I claim:

1. A plow apparatus for attachment to crawler-type tractors having tracks and an elevatable "C" frame, comprising:
    (a) a "V" shaped trailing plow adapted to be rididly secured to the forward end of the "C" frame for vertical movement therewith and having a lower portion with a width substantially equal to the distance between the tracks of the tractor,
    (b) a fore and aft extending strut hingedly secured at an aft end to the trailing plow for vertical swinging movement,
    (c) a "V" shaped lead plow rigidly secured at a forward end of the strut for swinging movement therewith,
    (d) a roller mounted on the lead plow at an aft end of the latter for providing rolling support of the lead plow on the ground surface following the lead plow,
    (e) a pair of forwardly converging telescopically extensible and retractable spreader arms for moving debris uprooted by the lead plow to opposite sides of the tractor, the spreader arms being hingedly secured at forward ends to the lead plow and hingedly securable at aft ends, for vertical swinging movement, to the "C" frame laterally outside the tracks of the tractor.

2. An apparatus as claimed in claim 1 in which the spreader arms include depending spreader portions on the spreader arms for levelling earth plowed and spread laterally by the lead plow.

3. An apparatus as claimed in claim 1 including a forward yoke on the trailing plow for slidably receiving the strut, said yoke having a pair of laterally spaced arms having aligned openings and a pin adapted to be extended through the aligned openings beneath the strut for linking the lead and trailing plow together for mutual vertical movement.

4. An apparatus as claimed in claim 1, wherein each of the spreader arms has a forwardly tapering spreader section adjacent the aft end for spreading humus into the path of the tracks of the tractor.

* * * * *